United States Patent

Hausler et al.

[11] Patent Number: 6,082,844
[45] Date of Patent: Jul. 4, 2000

[54] ANGLED DRIVE MOUNTING STRUCTURE FOR DATA STORAGE LIBRARY

[75] Inventors: Hartmut Ernst Hausler; Paul Yu-Fei Hu; Kevin Keith Kartchner; Steve John Roffinoli, all of Tuscon, Ariz.

[73] Assignee: International Business Machines Corporation, Armonk, N.Y.

[21] Appl. No.: 08/939,717

[22] Filed: Sep. 29, 1997

[51] Int. Cl.[7] ................................................. A47B 81/00
[52] U.S. Cl. .................... 312/283; 312/333; 312/334.27; 414/276
[58] Field of Search ................................ 312/283, 290, 312/285, 330.1, 332, 334.1, 334.5, 334.27, 334.29, 350, 223.2; 414/273, 276, 281; 360/92; 369/34, 36; 221/88

[56] References Cited

U.S. PATENT DOCUMENTS

| | | | |
|---|---|---|---|
| 844,338 | 2/1907 | Ellett et al. | 312/334.27 X |
| 2,769,551 | 11/1956 | Just | 312/333 X |
| 4,473,262 | 9/1984 | Staye | 312/330.1 X |
| 4,867,628 | 9/1989 | Ammon et al. | 414/273 |
| 5,132,789 | 7/1992 | Ammon et al. | 358/86 |
| 5,312,004 | 5/1994 | Krummell et al. | 414/276 X |
| 5,323,327 | 6/1994 | Carmichael et al. | 360/92 X |
| 5,377,174 | 12/1994 | Nakagawa et al. | 369/34 |
| 5,419,444 | 5/1995 | Strom | 414/276 X |
| 5,449,229 | 9/1995 | Aschenbrenner et al. | 312/283 |
| 5,508,859 | 4/1996 | Hu et al. | 360/92 |

*Primary Examiner*—Peter M. Cuomo
*Assistant Examiner*—James O. Hansen
*Attorney, Agent, or Firm*—John R. Holcombe; Robert M. Sullivan

[57] ABSTRACT

Disclosed is a mounting structure for mounting a horizontal insertion loading data storage drive in a data storage library having downwardly inclined shelves. A bracket mounts the data storage drive, and support bars are mounted in parallel in the data storage library and support the bracket on each side at a downwardly inclined angle. Thus, the horizontal insertion loading data storage drive is mounted at the downwardly inclined angle to receive data storage media from a robot accessor at the angle of the downwardly inclined shelves. The mounting structure support bars are parallel slides which slidably support the bracket at the downwardly inclined angle. A ratchet bar is mounted in the library at the downwardly inclined angle, and has a plurality of ratchet holes in the downwardly inclined direction. A latch is mounted on the bracket for engaging the ratchet holes of the ratchet bar to support the bracket and data storage drive against sliding on the support bar slides. The latch includes a movable tab for engaging the ratchet holes and a release actuator connected to the tab, so that operation of the release actuator disengages the tab from the engaged ratchet hole.

16 Claims, 4 Drawing Sheets

ANGLED DRIVE MOUNTING STRUCTURE FOR DATA STORAGE LIBRARY

TECHNICAL FIELD

This invention relates to data storage libraries, and, more particularly, to mounting of data storage drives in data storage libraries having robot accessor apparatus for accessing data storage media from shelves and providing the data storage media to the data storage drives.

BACKGROUND OF THE INVENTION

Data storage libraries are known for providing cost effective on-line access to large quantities of data. Typically, data storage libraries include a large number of data storage shelves on which are stored data storage media. The typical data storage media is a tape cartridge or an optical cartridge. A robot accessor typically accesses the data storage media from the data storage shelves and delivers the accessed media to a data storage drive for reading and/or writing data on the accessed media. Suitable electronics both operate the robot accessor and operate the data storage drives to transmit and/or receive data from an attached on-line host computer system.

In a conventional data storage library, the data storage shelves are arranged in a planar orthogonal arrangement forming a "wall" of data storage media. The plane may be a flat plane, or may be a cylindrical plane. To double the storage capacity, two "walls" of data storage media may be provided on either side of the robot accessor.

The robot accessor is therefore arranged to move in the two orthogonal directions to access date storage media along the "wall" of data storage media stored in the data storage shelves. With two "walls" of data storage media, the robot accessor is additionally arranged to move in a third direction to access either of the two "walls" of data storage media.

To maintain the data storage media in the data storage shelves without risk of displacement, the shelves in some data storage libraries are tilted at an inclined angle towards, or a downwardly inclined angle away from, the robot accessor. The inclined angle (which is about 10–15 degrees) prevents cartridge fall out due to earthquakes. The robot accessor is designed to access the data storage media from the data storage shelves at the downwardly inclined angle and to insert the accessed data storage media into the data storage drive at the same downwardly inclined angle. The data storage drive conventionally has a pivoting loader to accept the inserted data storage media at the downwardly inclined angle and then pivot downward to a level position, loading the data storage media in the read/write drive mechanism.

The quantity of data stored in the data storage library is a function of the number of data storage media stored in the library shelves and the data capacity of each data storage media. To increase the data capacity of the media, it would be advantageous to employ data storage drives having the ability to write data on the cartridges at high capacities. Some tape drives with the highest capacities have high precision horizontal insertion (or X-Y) loaders for receiving data storage media. Upon receiving the data storage media horizontally (X), the loaders move downward (Y) to precisely load the data storage media in the read/write drive mechanism, similar to conventional VCR loaders.

The high capacity horizontal insertion loader data storage drives may therefore not be compatible with a data storage library having downwardly inclined shelves.

A potential solution would be to utilize a robot accessor with an additional degree of motion for changing the angle of the robot accessor from that of a downward inclination for the shelves to a horizontal direction for the data storage drives. However, the cost of providing such a robot accessor is inconsistent with the cost effective access to data provided by existing data storage libraries. In addition, the use of horizontal shelves would not retain the data storage media during ground disturbances unless a costly latching mechanism were provided for each shelf.

SUMMARY OF THE INVENTION

An object of the present invention is to provide a cost effective means for making data storage drives which have a horizontal insertion loading mechanism compatible with a data storage library having downwardly inclined shelves.

Disclosed is a mounting structure for mounting a data storage drive in a data storage library. A bracket mounts the data storage drive, and first and second support bars are each mounted in parallel in the data storage library and support the data storage drive bracket at each side thereof at a downwardly inclined angle, so that the data storage drive is mounted at the downwardly inclined angle to receive data storage media from a robot accessor at the angle of the downwardly inclined shelves.

Data storage drives with a horizontal insertion loading mechanism may therefore be employed in a data storage library having downwardly inclined shelves and employing the conventional robot accessor.

To provide service access to the drives, the mounting structure support bars are parallel slides which slidably support each side of the bracket at the downwardly inclined angle. A ratchet bar is mounted in the library at the downwardly inclined angle, and has a plurality of ratchet holes therein in the downwardly inclined direction. A latch is mounted on the bracket for engaging the ratchet holes of the ratchet bar to support the bracket and data storage drive against sliding on the support bar slides. The latch includes a movable tab for engaging the ratchet holes, a spring for urging the tab into engagement with ID the ratchet holes, and a release actuator connected to the tab, so that operation of the release actuator disengages the tab from the engaged ratchet hole.

For a fuller understanding of the present invention, reference should be made to the following detailed description taken in conjunction with the accompanying drawings.

DETAILED DESCRIPTION OF THE INVENTION

Figure 1:
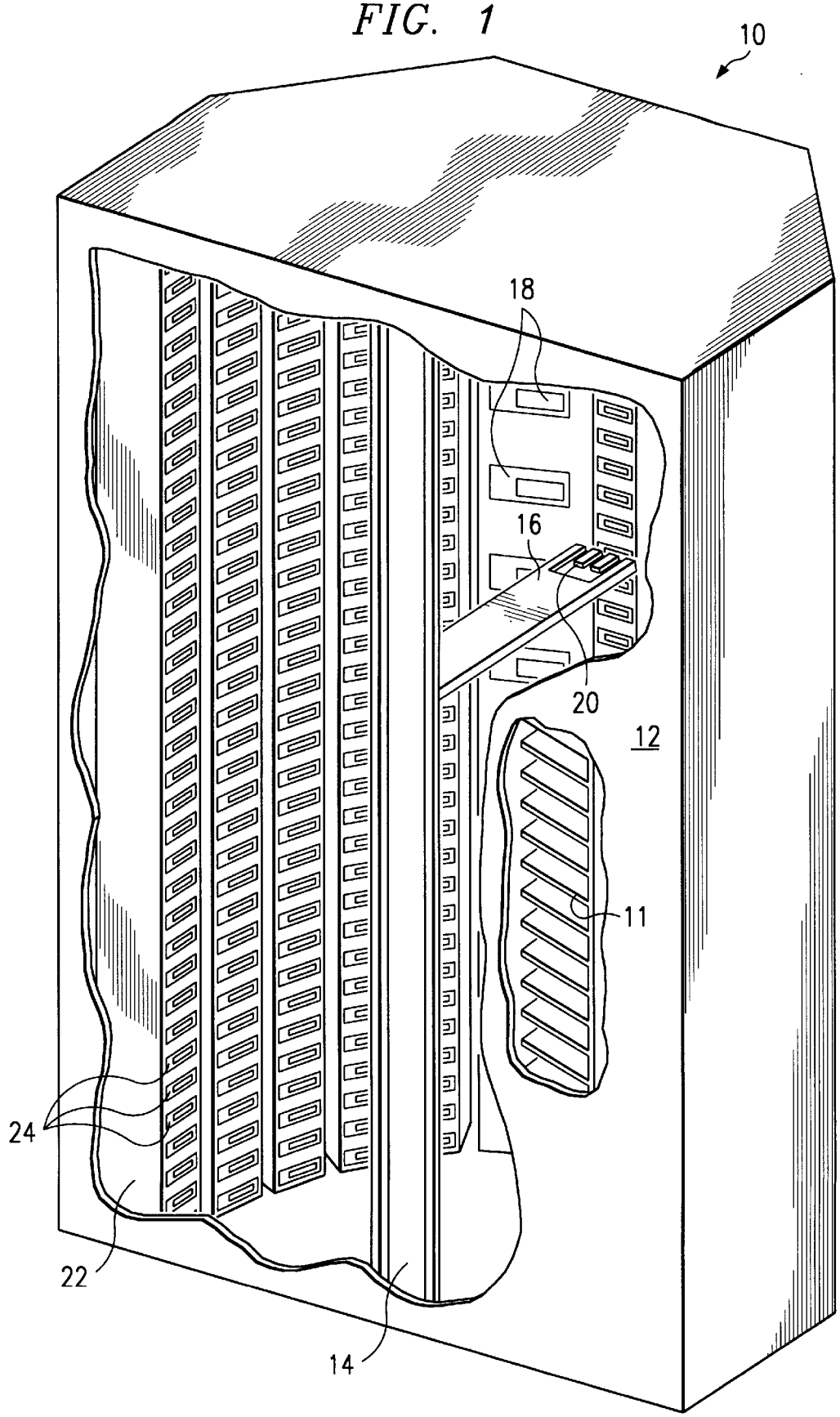
FIG. 1 is a partially cut away illustration of a data storage library of the present invention.

FIG. 1 shows a data storage library 10 of the present invention, with its front cover 12 partially cut away to permit viewing of the conventional shelves 11 which are at a downwardly inclined angle. The front cover 12 is also partially cut away to permit viewing of components inside the library. A robot accessor robot arm 16 is controlled by library electronics (not shown) to pivot about a z-axis 14 to align a gripper 20 with a particular rack 22 and is controlled to move vertically up and down, sliding on z-axis 14, to vertically align with a particular shelf 11 in rack 22. The gripper 20 is positioned at the end of robot arm 16 and is controlled by the library electronics to extend and retract from the end of the robot arm 16 to access and grip a selected data storage media 24 and withdraw the data storage media from the shelf 11.

The robot arm 16 is controlled by the library electronics to move the accessed data storage media 24 from the shelf 11 to a data storage drive 18 and insert the data storage media into the drive. The data storage drive 18 is controlled by suitable electronics (not shown) to search, read and/or write data on the data storage media 24. The robot arm 16 is controlled by the library electronics to return the data storage media 24 to a shelf 11 in rack 22. The illustration of FIG. 1 shows the data ID storage media 24 and shelves 11 arranged to store the media in a horizontal orientation. Alternatively, the data storage media 24 may be stored in a vertical orientation in shelves 11 which are spaced apart sufficiently to allow space for the vertically oriented media. The robot arm is therefore provided with an axis 15 of rotation to rotate the data storage media 24 between the vertical orientation at the shelves 11 and the horizontal orientation at the drives 18. The robot accessor is arranged to move any storage media cartridge 24 Between any shelf 11 and any data storage drive 18.

Any suitable data storage media 24 and horizontal insertion loading data storage drive 18 may be employed. An example of a high capacity horizontal insertion loading tape data storage drive is the IBM 3590 tape drive. Such data storage drives receive a cartridge horizontally and the loaders move in the vertical direction downward to precisely load the cartridge in the read/write mechanism. The mounting structure of the present invention allows the horizontal insertion loading data storage drive 18 to be mounted at the same downwardly inclined angle as that of the shelves 11, which is 10–15 degrees.

Figure 2:
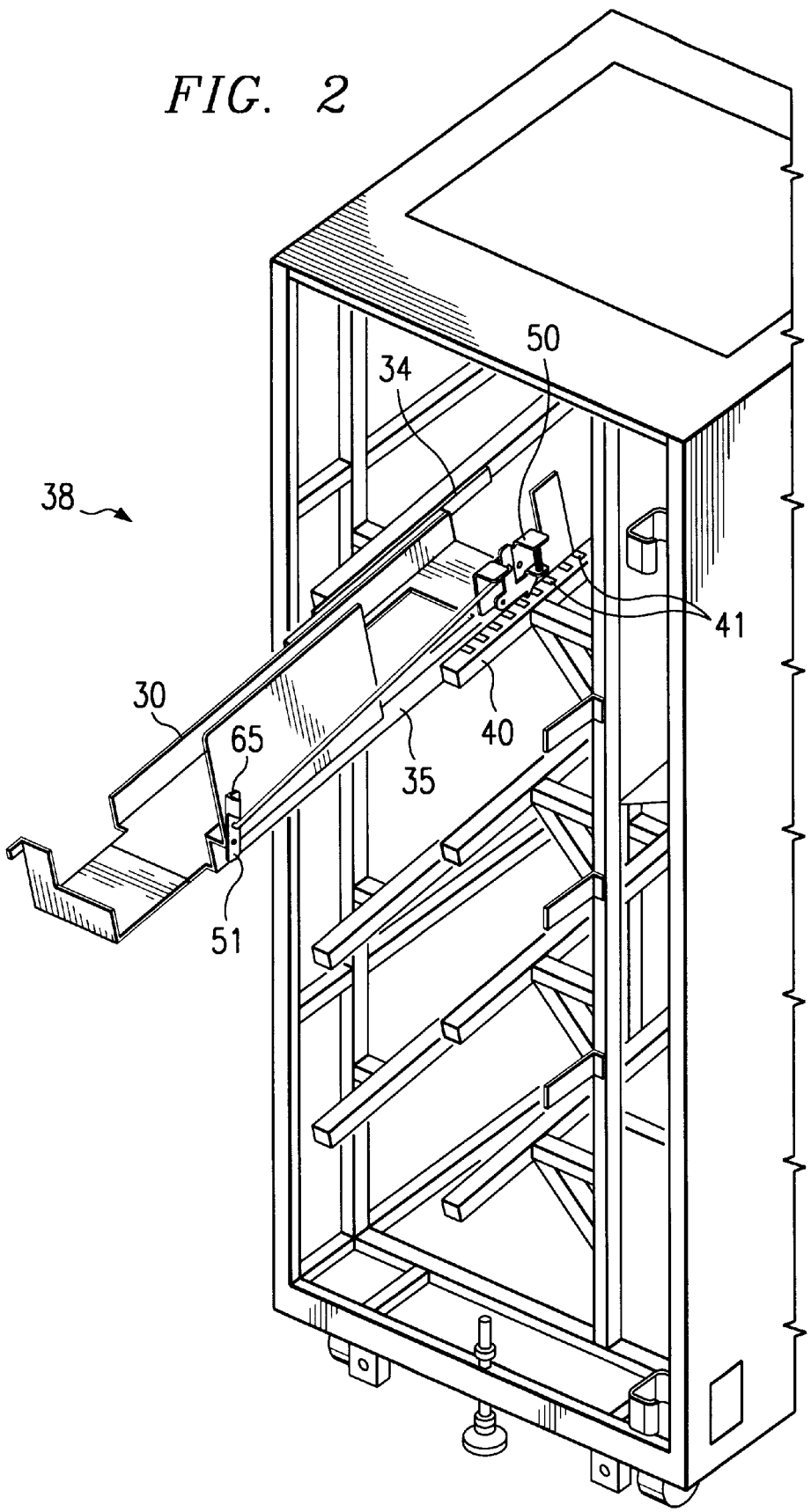
FIG. 2 is a perspective illustration of the mounting structure of the present invention for mounting data storage drives in the data storage library of FIG. 1.
Figure 3:
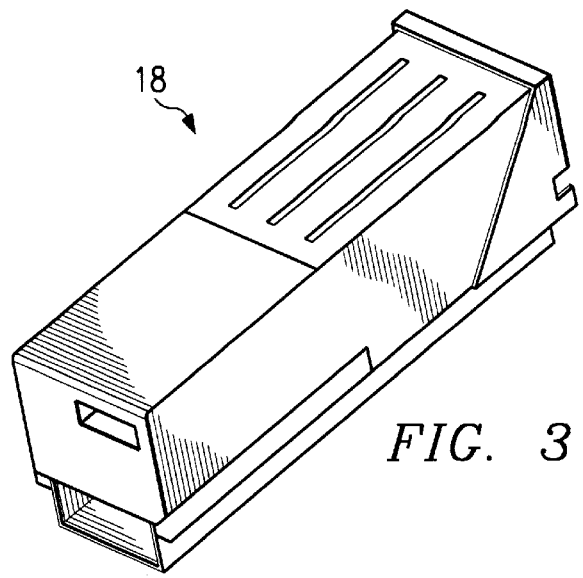
FIG. 3 is a perspective illustration of a data storage drive for mounting in the mounting structure of FIG. 2.

The mounting structure of the present invention is illustrated in FIG. 2. A bracket 30 is provided for mounting a data storage drive. A first support bar 34 and a second support bar 35 are each mounted in parallel in a frame 38 of the data storage library at the same downwardly inclined angle as the shelves 11 of FIG. 1. The support bars 34 and 35 support the data storage drive bracket 30 at each side thereof at the downwardly inclined angle, so that the data storage drive 18, shown in FIG. 3, is mounted at the downwardly inclined angle to receive data storage media from the accessor robot at the angle of the downwardly inclined shelves 11. As an example, shelves 11 and support bars 34 and 35 may be at a declining angle of 10 to 15 degrees from the horizontal.

Still referring to FIG. 2, the mounting structure support bars 34 and 35 are parallel slides which slidably support each side of the bracket 30 at the downwardly inclined angle. Thus, the bracket 30 and a data storage drive mounted on the bracket 30 may be moved on the slides from an operating position down the inclined slides for access to the drive for servicing or other purposes.

A ratchet bar 40 is mounted in the library frame 38 at the downwardly inclined angle, and has a plurality of ratchet holes 41 therein in the downwardly inclined direction. A latch 50 is mounted on the bracket 30 for engaging the ratchet holes of the ratchet bar to support the bracket 30 and data storage drive against sliding on the support bar slides. A release lever 51 may be operated to release the latch 50 and allow movement of the bracket 30 and the data storage drive along the support bar slides 34 and 35.

Figure 4:
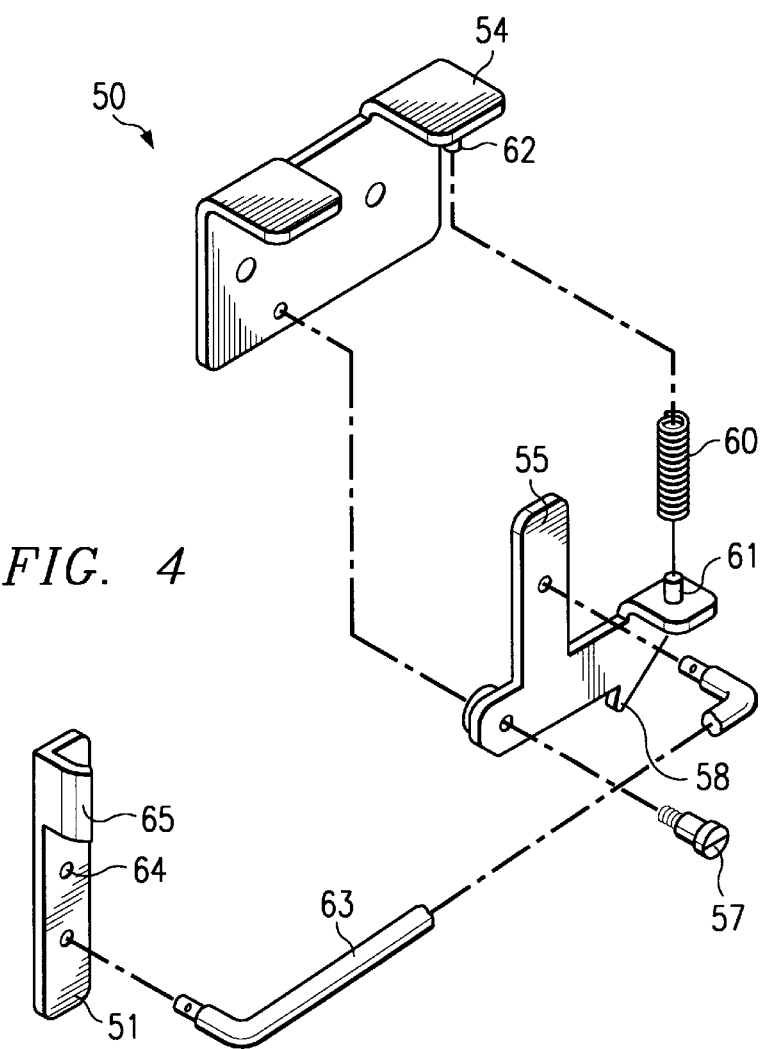
FIG. 4 is an exploded illustration of the latch of FIG. 2 in accordance with the present invention.

The components of the latch 50 are shown in FIG. 4. A latch bracket 54 supports a tab 55 which pivots about a pivot screw 57 to engage the ratchet holes 41 of ratchet bar 40. Tab 55 includes a registration surface 58 for precisely engaging the ratchet holes 41. The precise engagement is required for the uppermost ratchet hole to register the data storage drive 18 in the correct position for operation, receiving data storing media 24 from the library robot accessor at the forward end of the data storage drive 18. A spring 60 is mounted on pin 61 of tab 55 and on pin 62 of latch bracket 54 for urging the tab 55 into engagement with the ratchet holes 41.

A release actuator is provided including a release lever 51 connected to the pivotable tab 55 by a rod 63. Operation of the release lever by pushing the projecting ear 65 causes the lever to pivot about pivot point 64, and causes the pivotable tab to pivot about pivot screw 57 and disengage the tab from the engaged ratchet hole. The location of pivot 64 and connecting rod 63 may be reversed in lever 51 to allow the lever to be pulled to release the tab 55. Alternative arrangements of the latch 50 and the release actuator may be made to accomplish the registration of the bracket 30 with selective release. Examples of components include bail, rod, wire, lever, pull and lug.

Figure 5:
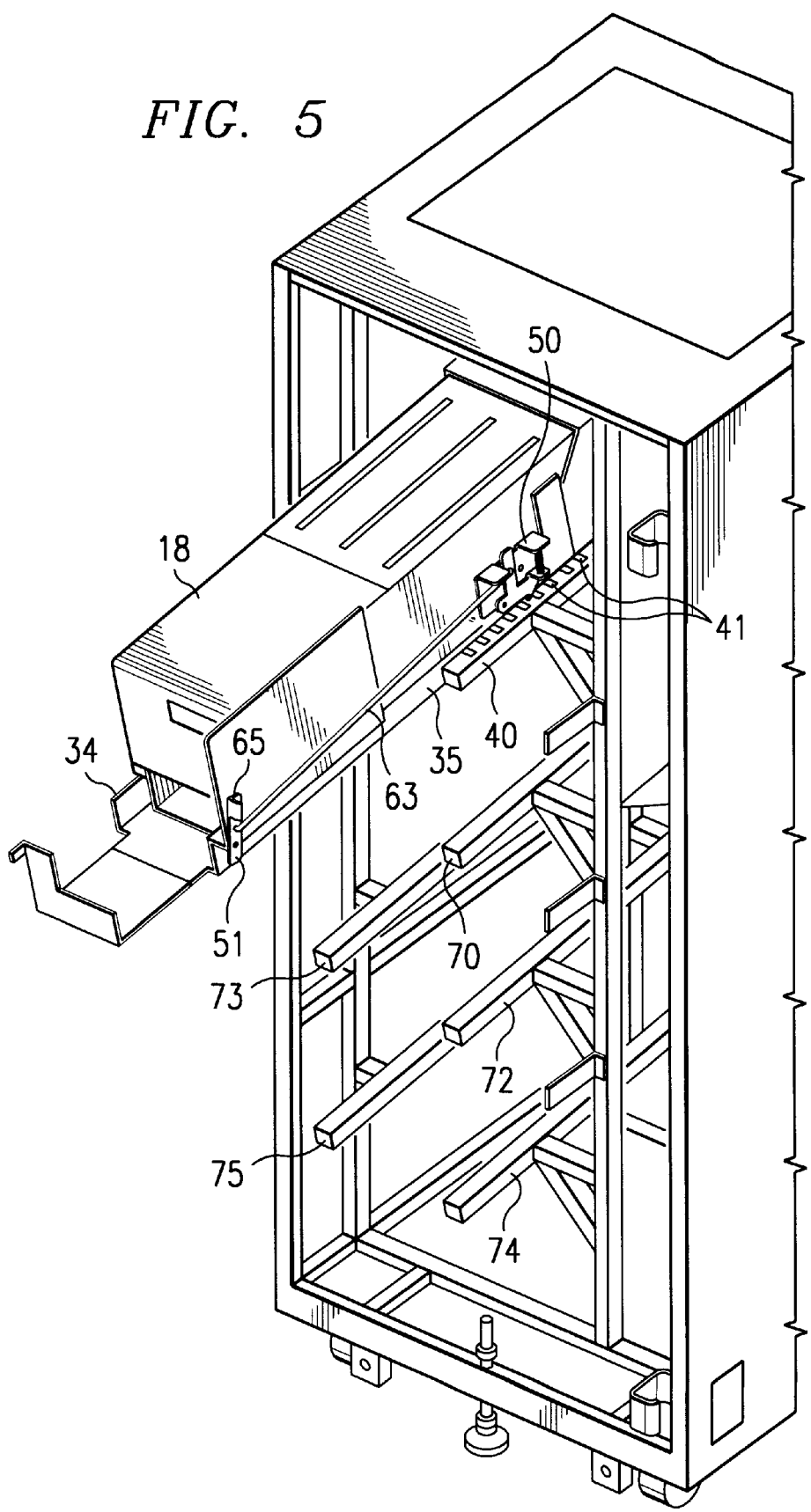
FIG. 5 is a perspective illustration of the mounting structure of the present invention as shown in FIG. 2 mounting the data storage drive of FIG. 3.

Thus, as shown in FIG. 5, the operator may pivot the release lever 51 to selectively release the tab 55 of latch 50 and move the bracket 30 and data storage drive 18 to selected locations of ratchet holes 41 along the downwardly inclined angle of the support bars 34 and 35. The data storage drive 18 is thereby selectively positioned along the downwardly inclined angle of the support bars and may be registered in the operating position at the uppermost end of the support bars.

Additional support bars 70 and 72–75 (one bar is not shown) are provided for mounting additional data storage drives in a closely spaced relationship at the same downwardly inclined angle. The support bars are spaced apart vertically by a distance equal to the height of the data storage drives 18 and a clearance dimension, so that the drives are in the downwardly inclined angle separated by the clearance dimension between the drives. The clearance dimension includes the thickness of the bracket 30 to insure that movement of one of the data storage drives 18 along the slides 34 and 35 of the support bars does not contact any vertically adjacent drive or bracket 30. An exemplary clearance dimension is 0.5 inch.

While the preferred embodiments of the present invention have been illustrated in detail, it should be apparent that modifications and adaptations to those embodiments may occur to one skilled in the art without departing from the scope of the present invention as set forth in the following claims.

We claim:

1. A mounting structure for supporting a data storage drive, said data storage drive having a forward end for insertion of a data storage medium thereat, said mounting structure for mounting said data storage drive in a data storage library, comprising:

a bracket for mounting said data storage drive;

first and second support bars, each mounted in parallel in said data storage library, said support bars comprising parallel slides for slidably supporting said data storage drive bracket at each side thereof at a downwardly inclined angle, so that said data storage drive is mounted at said downwardly inclined angle from said forward end;

a ratchet bar having a plurality of ratchet holes therein, said ratchet bar fixedly mounted in said library at said downwardly inclined angle, said plurality of ratchet holes in said downwardly inclined direction; and a latch mounted on said bracket for engaging said at least one ratchet hole of said ratchet bar to support said bracket against sliding on said support bar slides, said latch comprising:
  a movable tab for engaging said at least one ratchet hole;
  a spring urging said tab into engagement with said at least one ratchet hole; and
  a release actuator connected to said tab, so that operation of said release actuator disengages said tab from said at least one ratchet hole;
wherein, the uppermost of said ratchet holes, when engaged by said tab, registers said data storage drive in an operational position with respect to said library, and the remainder of said ratchet holes allowing said data storage drive to be withdrawn from said operational position along said parallel slides at said downwardly inclined angle and, when engaged by said tab, supporting said bracket and said data storage drive thereat.

2. The mounting structure of claim 1, wherein said bracket comprises a pivot axis mounted thereon; and said movable tab is arranged to pivot about said pivot axis.

3. The mounting structure of claim 2, wherein said bracket comprises a second pivot axis mounted thereon spaced from said first pivot axis; and said release actuator comprises a release lever arranged to pivot about said second pivot axis.

4. The mounting structure of claim 1, wherein said tab additionally comprises a registration surface for engaging said ratchet holes to register said tab in said downwardly inclined angle direction upon said engagement of said ratchet holes by said tab.

5. Mounting structures for supporting a plurality of data storage drives, each said data storage drive having a forward end for insertion of a data storage medium thereat, said mounting structures for mounting said data storage drives in a data storage library in a closely spaced vertical arrangement, comprising:

a plurality of brackets, each for mounting a corresponding one of said data storage drives; and a plurality of sets of first and second support bars, each bar of said set mounted in parallel in a spaced apart horizontal direction in said data storage library, said support bars comprise parallel slides for slidably supporting said data storage drive bracket at each side thereof at a downwardly inclined angle, so that said data storage drive is mounted at said downwardly inclined angle from said forward end, each of said sets of first and second support bars mounted in parallel in a vertical direction and spaced apart in said vertical direction by a distance greater than the height of said data storage drives by a clearance dimension, so that said data storage drives are mounted in parallel in said downwardly inclined direction spaced apart by said clearance dimension;

a ratchet bar for each said set of support bars having a plurality of ratchet holes therein, said ratchet bar fixedly mounted in said library at said downwardly inclined angle, said plurality of ratchet holes in said downwardly inclined direction; and a latch for each said set of support bars mounted on said bracket for engaging said at least one ratchet hole of said ratchet bar to support said bracket against sliding on said support bar slides, each said latch comprising:
  a movable tab for engaging said at least one ratchet hole of said corresponding ratchet bar;
  a spring urging said tab into engagement with said at least one ratchet hole; and
  a release actuator connected to said tab, so that operation of said release actuator disengages said tab from said at least one ratchet hole of said corresponding ratchet bear;
wherein, the uppermost of said ratchet holes, when engaged by said tab, registers the corresponding one of said data storage drives in an operational position with respect to said library, and the remainder of said ratchet holes allowing said corresponding data storage drive to be withdrawn from said operational position along said parallel slides at said downwardly inclined angle and, when engaged by said tab, supporting said bracket and said corresponding data storage drive thereat.

6. The mounting structures of claim 5, wherein each said bracket comprises a pivot axis mounted thereon; and said movable tab is arranged to pivot about said pivot axis.

7. The mounting structures of claim 6, wherein each said bracket comprises a second pivot axis mounted thereon spaced from said first pivot axis; and each said release actuator comprises a release lever arranged to pivot about said second pivot axis.

8. The mounting structures of claim 5, wherein each said tab additionally comprises a registration surface for engaging said ratchet holes of said corresponding ratchet bar to register said tab in said downwardly inclined angle direction upon said engagement of said ratchet holes by said tab.

9. In a data storage library for storing a plurality of storage media, said library having a plurality of storage cells at a downwardly inclined angle for storing said storage media, a robot accessor for retrieving said storage media from said storage cells at said downwardly inclined angle and transporting said storage media, and a plurality of data storage drives for receiving said storage media, each said data storage drive having a forward end for insertion of a data storage medium thereat, a plurality of mounting structures for mounting said data storage drives in a closely spaced vertical arrangement, comprising:

a plurality of brackets, each for mounting a corresponding one of said data storage drives; and a plurality of sets of first and second support bars, each bar of said set mounted in parallel in a spaced apart horizontal direction in said data storage library, supporting said data storage drive bracket at each side thereof at said downwardly inclined angle, so that said data storage drive is mounted at said downwardly inclined angle from said forward end, each of said sets of first and second support bars mounted in parallel in a vertical direction and spaced apart in said vertical direction by a distance greater than the height of said data storage drives by a clearance dimension, so that said data storage drives are mounted in parallel at said downwardly inclined angle spaced apart by said clearance dimension.

10. The mounting structures of claim 9, wherein said support bars comprise parallel slides for slidably supporting each side of said bracket at said downwardly inclined angle; and additionally comprising:

a ratchet bar for each said set of support bars having at least one ratchet hole therein, said ratchet bar fixedly mounted in said library at said downwardly inclined angle; and a latch for each said set of support bars mounted on said bracket for engaging said at least one ratchet hole of said ratchet bar to support said bracket against sliding on said support bar slides.

11. The mounting structures of claim 10, wherein each said latch comprises:

a movable tab for engaging said at least one ratchet hole of said corresponding ratchet bar; and a spring urging said tab into engagement with said at least one ratchet hole.

12. The mounting structures of claim 11, wherein each said latch additionally comprises a release actuator connected to said tab, so that operation of said release actuator disengages said tab from said at least one ratchet hole of said corresponding ratchet bar.

13. The mounting structures of claim 12, wherein each said ratchet bar has a plurality of ratchet holes therein in said downwardly inclined direction, the uppermost of said ratchet holes, when engaged by said tab, registers the corresponding one of said data storage drives in an operational position with respect to said library, and the remainder of said ratchet holes allowing said corresponding data storage drive to be withdrawn from said operational position along said parallel slides at said downwardly inclined angle and, when engaged by said tab, supporting said bracket and said corresponding data storage drive thereat.

14. The mounting structures of claim 13, wherein each said bracket comprises a pivot axis mounted thereon; and said movable tab is arranged to pivot about said pivot axis.

15. The mounting structures of claim 14, wherein each said bracket comprises a second pivot axis mounted thereon spaced from said first pivot axis; and each said release actuator comprises a release lever arranged to pivot about said second pivot axis.

16. The mounting structures of claim 13, wherein each said tab additionally comprises a registration surface for engaging said ratchet holes of said corresponding ratchet bar to register said tab in said downwardly inclined angle direction upon said engagement of said ratchet holes by said tab.

* * * * *